United States Patent [19]

Bratt

[11] Patent Number: 4,616,140

[45] Date of Patent: Oct. 7, 1986

[54] SYSTEM AND A METHOD FOR CONVERSION OF SOLAR RADIATION INTO ELECTRIC POWER

[75] Inventor: Jan C. Bratt, Malmö, Sweden

[73] Assignee: United Stirling AB, Malmö, Sweden

[21] Appl. No.: 550,174

[22] Filed: Nov. 9, 1983

[51] Int. Cl.⁴ .............................................. F03G 7/02
[52] U.S. Cl. ................................... 290/1 R; 290/52; 60/641.15
[58] Field of Search ............... 60/641.8, 641.15, 519; 290/52, 4 A, 1 R, 2, 6; 180/2 A, 65 C; 307/80, 86; 126/417, 424, 425, 451

[56] References Cited

U.S. PATENT DOCUMENTS

| | | | |
|---|---|---|---|
| 1,066,209 | 7/1913 | Ljungstrom | 290/52 |
| 2,110,142 | 3/1938 | Wilkinson | 307/80 |
| 3,152,260 | 10/1964 | Cummings | 60/641.15 |
| 3,421,596 | 1/1969 | Cristenson et al. | 180/65.4 |

OTHER PUBLICATIONS

"The Stirling Engine Solar Parabolic Dish System", pub. Oct. 1982, United Stirling AB and United Stirling, Inc.

Primary Examiner—William M. Shoop, Jr.
Assistant Examiner—W. E. Duncanson, Jr.
Attorney, Agent, or Firm—Finnegan, Henderson, Farabow, Garrett & Dunner

[57] ABSTRACT

A system for conversion of solar radiation into electric power comprises a single hot gas engine and two identical electric generators mounted at the two ends of the power output shaft of the hot gas engine.

3 Claims, 3 Drawing Figures

SYSTEM AND A METHOD FOR CONVERSION OF SOLAR RADIATION INTO ELECTRIC POWER

BACKGROUND OF THE INVENTION

1. Field of the Invention

This invention relates to a system for conversion of solar radiation into electric power comprising a hot gas engine mounted with its heater head in the focal space of a parabolic mirror and mechanically coupled to an electric generator.

2. Description of the Prior Art

The prior art is illustrated best in a folder published by United Stirling AB and United Stirling Inc in October 1982 and named "The Stirling Engine Solar Parabolic Dish System".

In the described prior art systems a single Stirling engine carries a single electric generator connected at one side of the engine, the engine-generator unit being carried by a number of beams secured to the periphery of a mirror supporting construction.

The Stirling engine itself is of approximately symmetrical design and as the heater head should be located in the focus of the mirror the unit consisting of engine and generator must be unsymmetrically supported causing a substantial torque on the beam structure—especially at small sun angles with the horizon.

SUMMARY OF THE INVENTION

The object of the invention is to provide a system of the above type which will cause less mechanical stress to the supporting beam structure and this is according to the invention obtained thereby that two generators of equal size are symmetrically arranged relative the engine.

The invention also relates to a method of governing the said new system and according to the invention only one of said generators is used at loads less than 50% of the maximum load.

The invention will be described in more detail, reference being made to the accompanying drawing.

Figure 1:
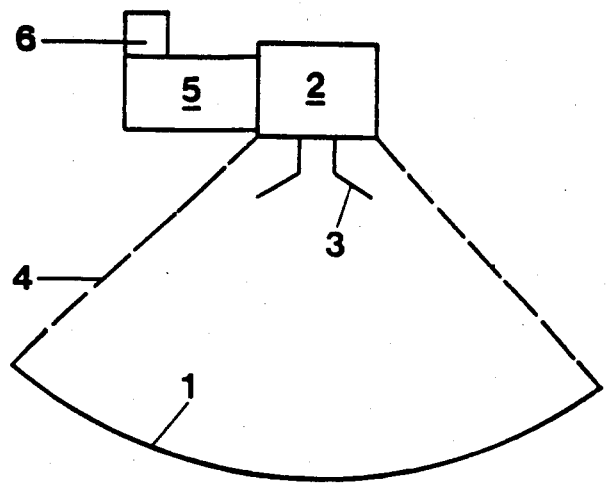
FIG. 1 shows schematically a system for solar energy conversion according to the prior art.

The known system shown in FIG. 1 comprises a parabolic mirror 1 provided with means (not shown) so as to enable its axis to be directed towards the sun during all day. A hot gas engine 2 is provided with a receiver 3 to be heated by concentrated solar radiation. The engine 2 is supported by a system of beams 4 relative the mirror 1, said beams 4 being indicated by dotted lines. The engine 2 is mounted so that the receiver 3 is located in the focal area of the mirror 1.

An electric generator 5 is mounted at one side of the engine 2 in conventional manner with its shaft directly coupled to the power output shaft of the engine 2. A starter engine 6 is mounted at the top of the generator 5 and is used for starting the hot gas engine. It is possible to use the generator 5 as a starter engine, but normally the starting current will exceed the allowed limit. In case a Y/Δ change over switch is used the starting current will decrease, but the torque will then be insufficient for cranking the hot gas engine. In practical use it will thus be a must to use a special starter motor.

As will be seen from FIG. 1 the design of the energy conversion system is unsymmetric and will cause extra stresses on the beams 4. Especially problems will arise when the system is exposed to heavy storms.

Figure 2:
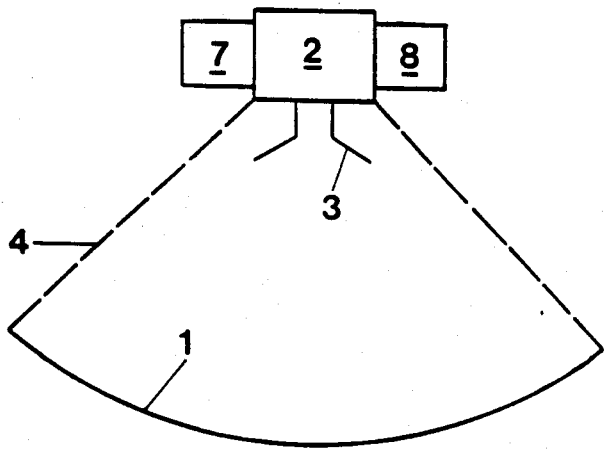
FIG. 2 shows schematically a system according to the invention.

FIG. 2 shows a corresponding system according to the present invention. Here, the hot gas engine 2 is connected to two generators 7 and 8 each having capacity of absorbing half of the maximum power output of the engine 2. Commercially each generator 7 or 8 will have approximately half the weight of the generator 5 and will be sold at half the price. The generators 7 and 8 are directly connected with their shafts to the two ends of the power output shaft of the hot gas engine 2. One of the generators 7, 8 may be used as a starter motor without Y/Δ change over switch. The starting current is half the magnitude of that consumed by the generator 5, but the torque is sufficient for starting the hot gas engine 2.

Thus it will be understood that the conversion system of FIG. 2 is lighter and cheaper than the system of FIG. 1 and due to the symmetric design the beams are exposed to less stress.

The invention also relates to a method of governing the system according to the invention. The system is governed so that at low loads (less than half maximum load) only one generator—7 or 8—is used.

Figure 3:
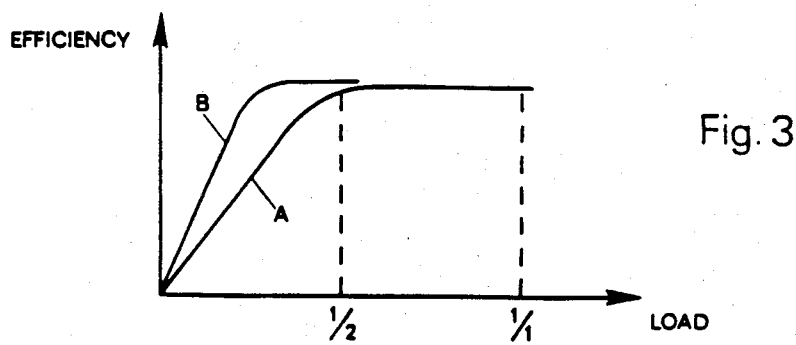
FIG. 3 is a diagram showing the efficiency as a function of the load of a generator as used in the prior art and of a generator as used in a system according to the invention.

This will increase the efficiency of the system as will be understood from FIG. 3 which is a diagram showing the efficiency of the generators in dependence on the load.

Curve A shows the efficiency of the generator 5. It will be understood that at loads less than half maximum load the efficiency is less than that obtainable with only one of the generators 7, 8 the efficiency of which being shown by the curve B.

I claim:

1. A system for conversion of solar radiation into electric power, comprising:
   a parabolic mirror for focusing said solar radiation on a focal space;
   a single hot gas engine including a heater head mounted with said heater head in said focal space of said parabolic mirror; and
   two electric generators of equal size and capacity symmetrically arranged on each side of said engine and mechanically coupled to said engine, said generators being separately operable at differing loads.

2. The system according to claim 1, wherein one of said generators is also a starter motor for said hot gas engine.

3. A method of governing the conversion of solar radiation into electric power by using a pair of electric generators of substantially equal capacity mechanically coupled to a solar-radiation-driven hot gas engine, comprising the steps of:
   energizing only one of said generators at loads less than 50% of the combined capacity of said generators; and
   energizing both of said generators at loads greater than 50% of the combined capacity of said generators.

* * * * *